(12) United States Patent  (10) Patent No.:  US 8,214,379 B2
Williams et al.  (45) Date of Patent:  Jul. 3, 2012

(54) COMPOSING VIEWS WITH AUTOMATIC CREATION OF LINKS

(75) Inventors: Antony S. Williams, Mercer Island, WA (US); Stephen M. Danton, Seattle, WA (US); Michael C. Murray, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 238 days.

(21) Appl. No.: 12/696,628

(22) Filed: Jan. 29, 2010

(65) Prior Publication Data

US 2011/0191362 A1  Aug. 4, 2011

(51) Int. Cl.
*G06F 7/00* (2006.01)
*G06F 17/30* (2006.01)

(52) U.S. Cl. .................. 707/758; 707/765; 707/769

(58) Field of Classification Search .................. None
See application file for complete search history.

(56) References Cited

U.S. PATENT DOCUMENTS

| | | |
|---|---|---|
| 5,615,367 A | 3/1997 | Bennett |
| 5,835,091 A | 11/1998 | Bailey |
| 6,025,844 A | 2/2000 | Parsons |
| 6,278,448 B1 | 8/2001 | Brown |
| 6,282,547 B1 | 8/2001 | Hirsch |
| 6,405,221 B1 | 6/2002 | Levine |
| 2004/0015783 A1 | 1/2004 | Lennon |
| 2004/0181543 A1* | 9/2004 | Wu et al. ............... 707/102 |
| 2007/0156740 A1* | 7/2007 | Leland et al. ........... 707/102 |

OTHER PUBLICATIONS

Ahlberg, Christopher, et al., "IVEE: An Information Visualization & Exploration Environment", Proceedings of the Proceedings on Information Visualization (INFOVIS '95), 1995, pp. 66-73.
MSDN, Feature Tour "Visual Data Designer", Based on information and belief available, at least as early as Oct. 15, 2009, 3 pages.

* cited by examiner

*Primary Examiner* — Jay Morrison
(74) *Attorney, Agent, or Firm* — Workman Nydegger

(57) ABSTRACT

The present invention extends to methods, systems, and computer program products for composing views with automatic creation of links. Generally, views receive data through a query. Views also can have bindings to variables, for example, to represent what is selected in the view. Analyzing these queries can be used to determine whether a composition is valid, and how to compute a new query for a composed second view. In a composite view, a selection variable is utilized, and is bound to the selection parameter of the new first view. The data query for the second new view is re-written to refer to the selection variable in the composite.

19 Claims, 3 Drawing Sheets

COMPOSING VIEWS WITH AUTOMATIC CREATION OF LINKS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Many applications include accessing data from a database and presenting a view of the accessed data to a user at a display device. For example, a sales application can query a purchasing database to access customer purchase orders and display the content of purchase orders to a sales executive. To present more complex and/or granular views of data, views can be combined such that one view depends on data in another view. However, configuring an application to present a combined data view is relatively complex, potentially requiring significant technical knowledge. For example, shared source coupling as well as master/detail coupling requires a number of different queries (written in a query or other programming language) as well as a user-interface control to receive user input.

For shared source coupling, at least first and second queries query data from the same source. To obtain the user input, a user-interface control, such as, for example, a text box is designed to receive user input. The user input can be a value that identifies the data element from the source (e.g., an employee's name) that is to be used as the basis for the first query (e.g., to get the employee's contact information) and the second query (e.g., to get the employee's salary history). As such, input to the user-interface control must also be bound programmatically to each of the first and second queries. Based on the user input, results from the first and second (and any other) queries are displayed.

For master/detail coupling, the queries can include a master query and a detail query. The master query is configured to return a list of data elements (e.g., a list of people's names) from a database. The detail query is configured to return additional data from the database (e.g., a telephone number and address) corresponding to a data element (e.g., a person's name) returned by the master query. However, further user input (e.g., a specified person's name) is typically needed to determine which data element to run the second query against. To obtain the further user input, a user selects an item from the results of the first query, such as, for example, by clicking on an element in a first list. As such, the further user input selects a value that identifies the data element in the list of data elements that is to be used as the basis for the second query. Accordingly, the selection from the first list is typically bound programmatically to the second query to perform updates. Results from the master query along with results from detail query (based on the user input) are displayed.

Accordingly, design and development of these and other types of queries and user-interface controls requires technical skills that are typically well beyond those of the average computer user. To some extent, graphical tools can be used to reduce the knowledge required to implement combined queries. However, even when using graphical tools, the bindings between user-interface controls and queries need to be updated. Implementing dependent view updates can require relatively complex listening code that listens to changes in one view and reflects those changes in a second view. For example, if an employee record is changed in a database, a detail view for the employee may need to reflect the change. In absence of listening code, a manual update is typically required. However, once a detail view is presented, a viewing user may not recognize and/or may have no way to know the employee record was even changed.

BRIEF SUMMARY

The present invention extends to methods, systems, and computer program products for composing views with automatic creation of links. It is detected that first and second data views are to be combined in a composite data view. The first data view is configured to present data elements from a database. The second data view is configured to present further data elements related to a data element selected from the first view.

In response to detecting that the first and second views are to be combined in a composite data view, a configuration is created for the composite data view. Creating the configuration for the composite view includes establishing a selection variable under the control of the composite view. The selection variable is for storing a value that identifies a data element in the first view. Creating the configuration for the composite view includes configuring a user-interface control to update the selection variable with a received value. Creating the configuration for the composite view includes re-writing the second query to use the received value stored in the selection variable as the source location for the second query. The created configuration is instantiated to present the composite data view at a display device.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
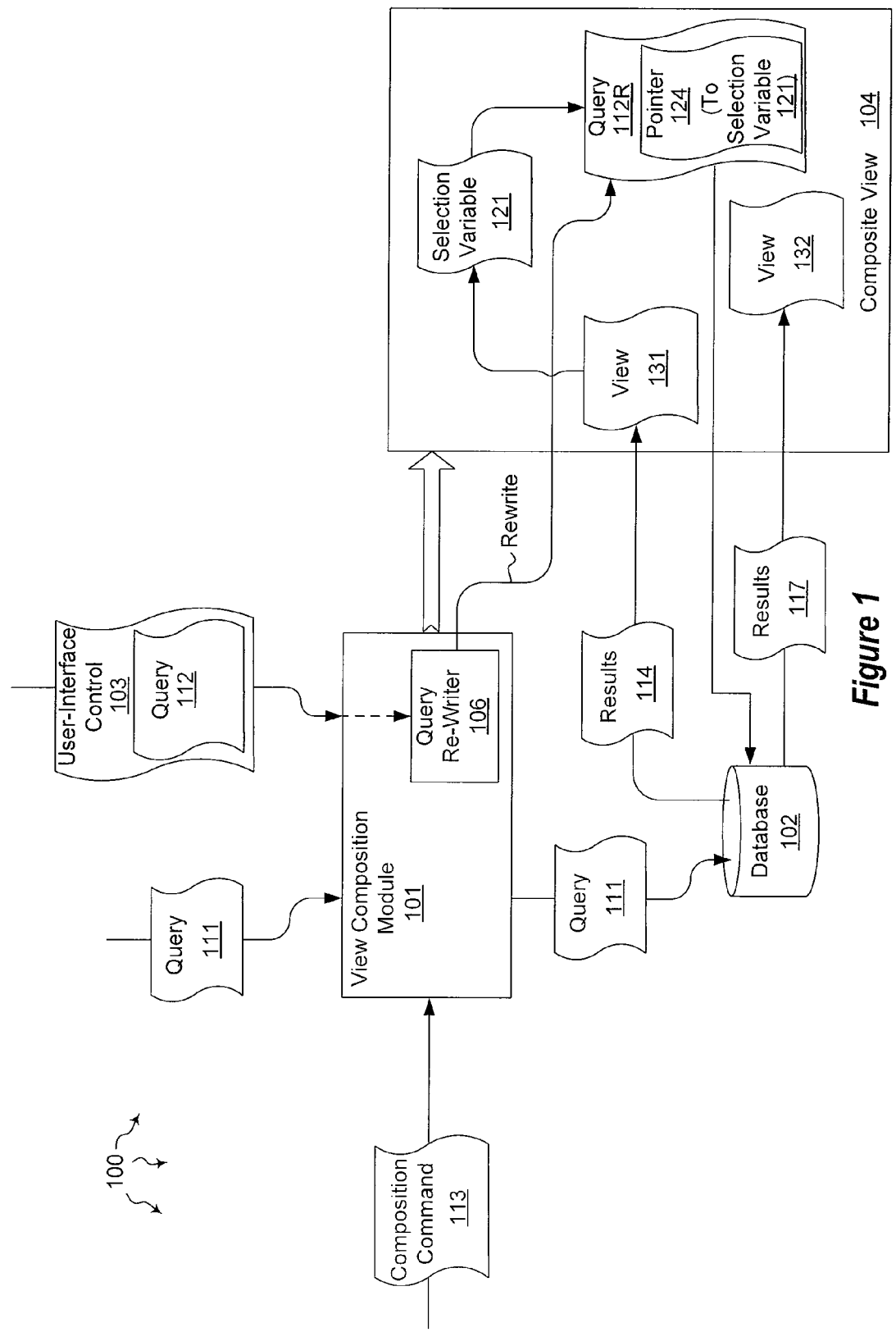
FIG. 1 illustrates an example computer architecture that facilitates composing views with automatic creation of links.

The present invention extends to methods, systems, and computer program products for composing views with automatic creation of links. It is detected that first and second data views are to be combined in a composite data view. The first data view is configured to present data elements from a database. The second data view is configured to present further data elements related to a data element selected from the first view.

In response to detecting that the first and second views are to be combined in a composite data view, a configuration is created for the composite data view. Creating the configuration for the composite view includes establishing a selection variable under the control of the composite view. The selection variable is for storing a value that identifies a data element in the first view. Creating the configuration for the composite view includes configuring a user-interface control to update the selection variable with a received value. Creating the configuration for the composite view includes re-writing the second query to use the received value stored in the selection variable as the source location for the second query. The created configuration is instantiated to present the composite data view at a display device.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, views receive data through a query. Views also can have bindings to variables, for example, to represent what is selected in the view. Analyzing these queries can be used to determine whether a composition is valid, and how to compute a new query for a composed second view. In a composite, a selection variable is utilized, and is bound to the selection parameter of the new first view. The data query for the second new view is rewritten to refer to the selection variable in the composite.

FIG. 1 illustrates an example computer architecture 100 that facilitates composing views with automatic creation of links. Referring to FIG. 1, computer architecture 100 includes view compositions module 101, database 102, user-interface control 103, and composite view configuration 104.

As depicted in computer architecture 100, view composition module 101 can receive composition command 113, query 111, and user-interface control 103. Query 111 can be configured to query database 102 for specified data, such as, for example, a list of employees (e.g., in results 114). User-interface control 102 further includes query 112. Query 112 can be configured to query for more detailed data for a portion of the specified data returned from query 111 (i.e., related a portion of results 114), such as, for example, all the tasks for a particular employee. Generally, queries can be written using a combination of one or more query languages, such as, for example, SQL, Visual Basic, the Microsoft code name "M" language, etc.

When received at view composition module 101, query 112 is configured to receive input from user-interface control 103 (e.g., a text box) to access an input source location defining the portion of specified data (results 114) for which more detailed information is to be obtained.

Composition command 113 can include instructions indicating that a data view for query 111 is to be combined with a data view for query 112. Thus, upon receiving composition command 113, view composition module 101 can detect that views for query 111 and query 112 are to be combined into a composite view. In response to detecting that the views area to be combined, view composition module 101 creates a configuration for the composite data view (e.g., composite view configuration 104).

Creating a composite data view configuration can include establishing a selection variable under the control of the composite view. The selection variable can store a value that identifies a data element in the first view. For example, view composition module 101 can establish selection variable 121 under the control of composite view 104. Creating a composite data view configuration can also include configuring a user-interface control to update the selection variable with a received value. For example, view composition module 101 can configure user-interface control 103 to update selection variable 121 in response to user input 116. Creating a composite data view configuration can also include re-writing a query to re-direct the query to use the value stored in the selection variable as the source location for the query. For example, query re-writer 106 can rewrite query 112 (as query 112R) to use the value stored in selection variable 121.

The created configuration can be instantiated to present the composite data view at the display device. For example, composite view 104 can be instantiated at a display device to present data from database 102. Within composite view 104, view 132 presents results from query 111. Query 112 can be used to select further information for an element in view 131. For example, query 112R can query database 102 for further information related to an element in view 131. This further information can be presented in view 132.

Figure 2:
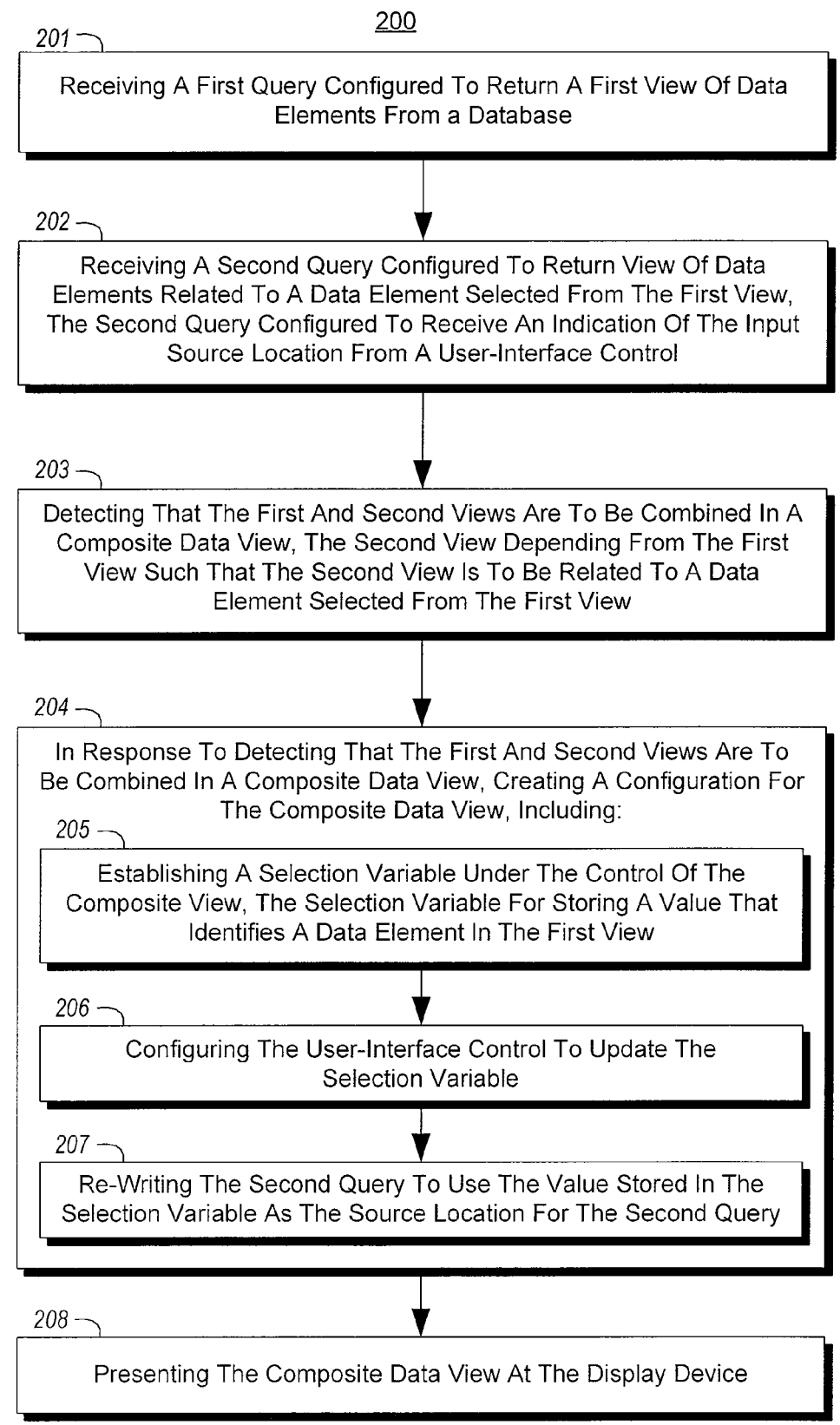
FIG. 2 illustrates a flow chart of an example method for configuring a composite data view.

FIG. 2 illustrates a flow chart of an example method 200 for configuring a composite data view. Method 200 will be described with respect to the components and data depicted in computer architecture 100.

Method 200 includes an act of receiving a first query configured to return a first view of data elements from a database (act 201). For example, view composition module 101 can receive query 111. Query 111 can be configured to return a first view of data elements from database 102.

Method 200 includes an act of receiving a second query configured to return a second view of data elements related to a data element selected from the first view, the second query configured to receive an indication of the input source location from a user-interface control (act 202). For example, view composition module 101 can receive user-interface control 103 containing query 112. Query 112 can be configured to return a second view of data elements related to a data element returned in response to query 111. When received, query 112 is configured to receive an input for its query criteria from user-interface control 103.

Method 200 includes an act of detecting that the first and second views are to be combined in a composite data view, the second view depending from the first view such that the second view is to be related to a data element selected from the first view (act 203). For example, view composition module 101 can received composition command 113. Composition command 113 can be a user entered command or an automatically generated command based on previously entered configuration options.

Generally, it is possible to infer a relationship between a first view (e.g., the view for query 111) and a second view (e.g., the view for query 112). For example, a relationship can be inferred when a pre-condition is satisfied for a composition. A pre-condition can include the selection type of a first view (e.g., the view for query 111) matching the source type for the second view (e.g., the view for query 112). Upon inferring such a relationship, composition command 113 can be issued.

In response to detecting that the first and second views are to be combined in a composite data view, method 200 includes an act of creating a configuration for the composite data view (act 204). For example, upon receiving composition command 113, view composition module 101 can create a configuration for composite view 104.

Creating a configuration for a composite view includes establishing a selection variable under the control of the composite view, the selection variable for storing a value that identifies a data element in the first view (act 205). For example, view composition module 101 can establish selection variable 121 under the control of composite view 104. Selection variable 121 can be used to store a value that identifies a data element in view 131. Accordingly, selection variable 121 essentially takes on the role of user-interface 103.

Creating a configuration for a composite view includes configuring the user-interface control to update the selection variable (act 206). For example, view composition module 101 can send UI update 122 to user-interface control. UI update 122 can (re)configure user-interface control 103 (e.g., a text box) to store entered values in selection variable 121. For example, user-interface control 103 can receive user input 116 identifying a data element from within view 131. User-interface control 103 can send update 117 to store a value identifying the data element in selection variable 121.

Creating a configuration for a composite view includes re-writing the second query to use the value stored in the selection variable as the source location for the second query (act 207). For example, query re-writer 106 can re-write query 112 as query 112R. Query 112R includes pointer 124 (to selection variable 121) identifying the value stored in selection variable 121 as the source location for query 112R.

Method 200 includes presenting the composite data view at the display device (act 208). For example, views 131 and 132 can be presented as composite view 104 at a display device.

Figure 3:
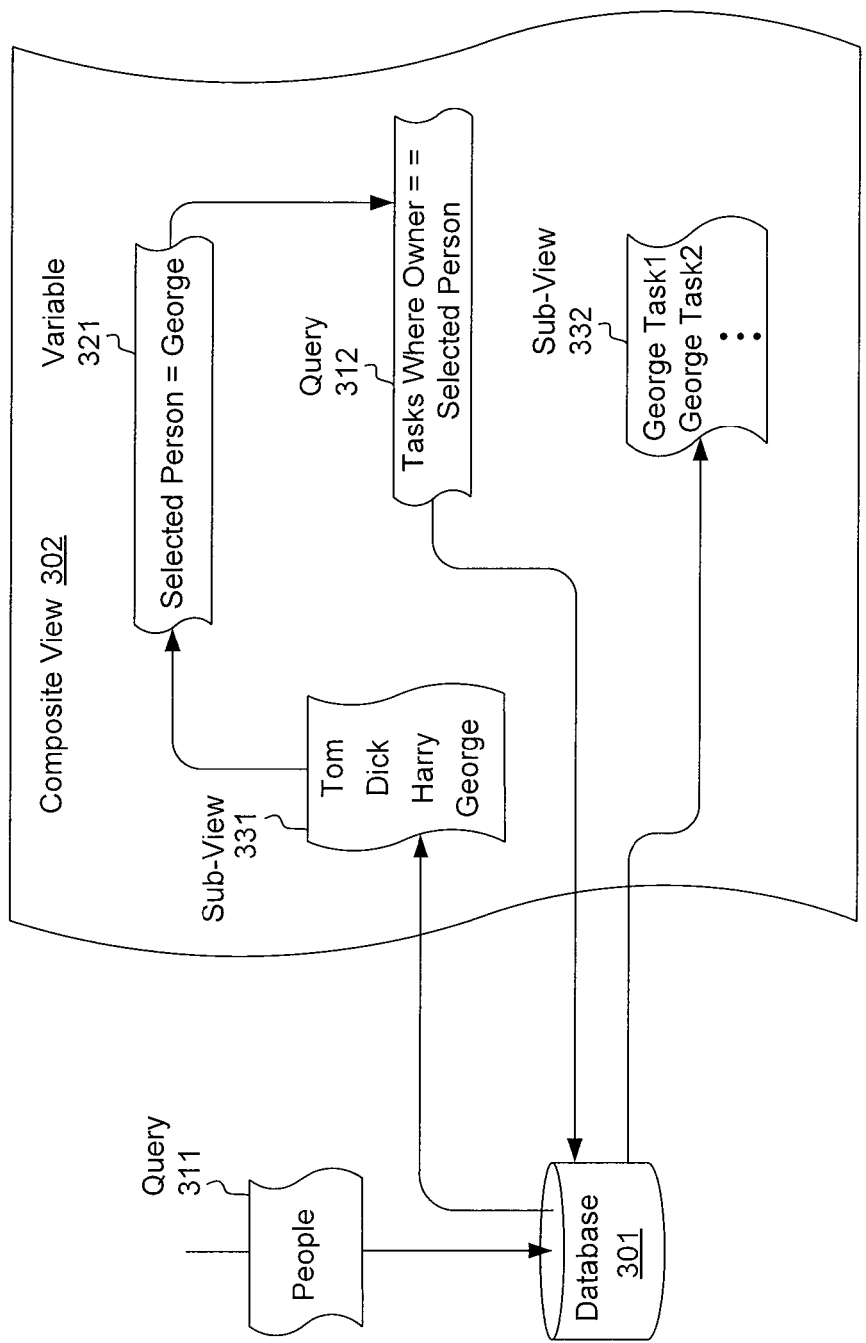
FIG. 3 illustrates an example composite data view.

FIG. 3 illustrates an example composite data view 302. Query 311 is issued against database 301 to obtain a list of people. The results of query 311 are presented in sub-view 331. Query 312 is then issued to query for tasks for George (the value of variable 321). The results of query 312 are presented as sub-view 332.

Accordingly, embodiments of the invention can be used to implement at least two different kinds of view compositions. Shared source composition can be used to couple two or more views that display information related to the same entity. Selection based compositions can be used where a view has a selection and a coupled view shows information related to the selected entity (e.g., master/detail coupling).

In some embodiments, the data for a view is determined by two properties: a source specification and a navigation path. The navigation path is conceptually a function of one parameter (the Source). The data is obtained by evaluating the navigation path against the source. For example:

Source: People(42)
Navigation path: Source=>Tasks where Owner==Source
The is equivalent to a querybar containing
Tasks where Owner==People(42)
This query is generated by applying the Navigation function to the Source:
QueryBar: Navigation(Source)

The Navigation path may be null. An invariant is that the parameter of the navigation path function matches that of the source. This invariant is established when the view is created, otherwise the operation can be disallowed.

Views can also provide a property that indicates the type of entity that is or can be selected in that view. This property can be used to consider composed views and hierarchical composition. A selection type may be determined from a specification on the view template:

```
Type SelectionKind = {
    "None",
    "Any",                      //eg tree, properties view
    "SameAsInputRecordType",    //eg generic list view
    "Specific" }                //see SelectionType for the truth
SelectionType: Type
```

This model is advantageous for at least two reasons: the fits well with shell models of opening workpads based on selections and properties/relationships. The selection becomes the Source, and the property/relation becomes the navigation. The model can be generalized to multi-step navigations, such as, for example:

Source=>(Tasks where Owner==Source).Select (t=>t.DueDate)

Shared source compositions become simpler to implement since the Source property is separated from the Navigation path. To compose two views with a common source, for example:

View1: List(Source=People(42), Navigation="Source=>Tasks where Owner==Source, SelectionType=Tasks)
View2: List(Source=People(42), Navigation="Source=>Bugs where AssignedTo==Source, SelectionType=Bugs)

After composition this results in:

```
SplitPanel(
    Source=People(42),
    List(Source=Source, Navigation="Source=>Tasks where
        Owner==Source"),
    List(Source=Source, Navigation="Source=>Bugs where
        AssignedTo==Source, SelectionType=Bugs)
    SelectionType=Any
)
```

The pre-condition for this composition can be that the source for each query be the same (or at least the same type). Such a composition does not have a strongly-typed output selection: it could come from either of the contained views. However, it may be a strongly-typed input data requirement, making it more suitable for selection-based composition.

Accordingly, this model can more easily be used to construct selection-based couplings. Given two views where one offers a selection of type T, and the other has a Source of type T, a composed view with a shared selection variable is bound to the selection property of the first view, and the source of the second view is bound to the shared variable. For example:

View 1: List(Source=People, SelectionType=People)
View2: List(Source=People(42), Navigation="Source=>Tasks where Owner==Source", SelectionType=Tasks)

When these two views are composed, the following is obtained:

```
SplitPanel(
    Source=People,
    Variable selectedPerson,
    List(Source=People, SelectionType=People, Selection=SelectedPerson),
    List(Source=SelectedPerson, Navigation="Source=>Tasks where
        Owner==Source"),
    SelectionType=Tasks
)
```

The pre-condition for this composition can be that the type of the selection in the first view matches the source type for the second view.

Combining the two composition techniques structure such as the following can be created:

```
SplitPanel(
    Source=People,
    Variable selectedPerson,
    List(Source=People, SelectionType=People,
        Selection=SelectedPerson),
    SplitPanel(
        Source=SelectedPerson,
        List(Source=Source, Navigation="Source=>Tasks where
            Owner==Source"),
        List(Source=Source, Navigation="Source=>Bugs where
            AssignedTo==Source, SelectionType=Bugs")
        SelectionType=Any
    )
    SelectionType=Any
)
```

Accordingly, through a user interface gesture, a user can request composition of two existing views, the first showing one set of data, and having a selection that identifies some of that data. The second view can show data that corresponds to the items that are selected in the first view. The data in the second view can be matched up with the selection in the first. A composite of the two views can be constructed where the data in the second view is defined in such a way that it automatically changes when the selection is changed in the first view.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for configuring a composite data view, the method comprising:

an act of detecting that a first data view and a second data view are to be combined in a composite data view, the first data view being configured to present first data elements from a database based on a first database query, the second data view being configured to present further data elements related to a selected data element of the first data elements, which is selected by a user from the first view, based on a second database query that uses a particular value that identifies the selected data element, such that the second data view depends from data in the first data view;

in response to detecting that the first data view and the second data view are to be combined in the composite data view, an act of creating a configuration for the composite data view, including:

an act of establishing a selection variable that is under the control of the composite view, the selection variable being configured to store the particular value that identifies the selected data element in the first view;

an act of a processor automatically configuring a user-interface control to update the selection variable with the particular value, when received; and an act of the processor automatically re-writing the second database query to re-direct the second database query to use the particular value in the selection variable as the source location for the second database query; and an act of instantiating the created configuration to present the composite data view at a display device.

2. The method as recited in claim 1, wherein the act of creating a configuration for the composite data view comprises an act of creating a configuration for a shared source composite view.

3. The method as recited in claim 1, wherein the act of creating a configuration for the composite data view comprises an act of creating a configuration for a selection-based composite view.

4. The method as recited in claim 3, wherein the act of creating a configuration for a selection-based composite view comprises an act of creating a configuration for a master/detail coupling.

5. The method as recited in claim 3, wherein the act of detecting that the first data view and the second data view are to be combined in a composite data view comprises an act of inferring a relationship between the selection type of the first data view and the source type of the second data view.

6. The method as recited in claim 5, wherein inferring a relationship between the selection type of the first data view and the source type of the second data view comprises an act of determining that the selection type of the first data view matches the source type of the second data view.

7. The method as recited in claim 1, wherein the act of creating a configuration for the composite data view comprises an act of creating a configuration for a combined shared source and selection-based composite view.

8. One or more computer storage media having stored thereon computer-executable instructions that, when executed at a processor of a computer system, cause the computer system to perform a method for configuring a composite data view, including the following:

receive a first database query that is configured to return a first view of data elements from a database;

receive a second database query that is configured to return a second view of data elements related to a data element that was selected by a user from the first view, the second database query being configured to receive an indication of an input source location from a user-interface control based on a value of the selected data element;

detect that the first and second data views are to be combined in a composite data view, the second view depending from the first view, such that the second view is to be related to the selected data element that was selected by the user from the first view;

in response to detecting that the first and second views are to be combined in a composite data view, create a configuration for the composite data view, including:

establishing a selection variable that is under the control of the composite view, the selection variable being configured to store a particular value that identifies a user-selected data element in the first data view;

configuring the user-interface control to update the selection variable with the particular value; and re-writing the second database query to use the particular value stored in the selection variable as the source location for the second database query; and present the composite data view at a display device.

9. The computer storage media as recited in claim 8, wherein computer-executable instructions that, when executed, cause the computer system to detect that the first and second data views are to be combined in a composite view comprise computer-executable instructions that, when executed, cause the computer system to infer a relationship between the selection type of the first view and the source type of the second view.

10. The computer storage media as recited in claim 9, wherein computer-executable instructions that, when executed, cause the computer system to infer a relationship between the selection type of the first view and the source type of the second view comprise an act of computer-executable instructions that, when executed, cause the computer system to determine that the selection type of the first view matches the source type of the second view.

11. The computer program product storage media as recited in claim 8, wherein computer-executable instructions that, when executed, cause the computer system to create a configuration for the composite data view comprise computer-executable instructions that, when executed, cause the computer system to create a configuration for a shared source composite view.

12. The computer program product storage media as recited in claim 8, wherein computer-executable instructions that, when executed, cause the computer system to create a configuration for the composite data view comprise computer-executable instructions that, when executed, cause the computer system to create a configuration for a selection-based composite view.

13. The computer program product storage media as recited in claim 12, wherein computer-executable instructions that, when executed, cause the computer system to create a configuration for a selection-based composite view comprise computer-executable instructions that, when executed, cause the computer system to create a configuration for a master/detail coupling.

14. The computer storage media as recited in claim 13, wherein computer-executable instructions that, when executed, cause the computer system to create a configuration for a master/detail coupling comprise computer-executable instructions that, when executed, cause the computer system to infer a relationship between the selection type of the first data view and the source type of the second data view.

15. The computer storage media as recited in claim 8, wherein computer-executable instructions that, when executed, cause the computer system to create a configuration for the composite data view comprise computer-executable instructions that, when executed, cause the computer system to create a configuration for a combined shared source and selection-based composite view.

16. A computer system, the computer system comprising:
one or more processors;
system memory;
a display device; and
one or more computer storage media having stored thereon computer-executable instructions representing a view composition module, the view composition module being configured to:
  receive a first database query that is configured to return a first view of data elements from a database;
  receive a second database query that is configured to return a second view of data elements related to a data element that was selected by a user from the first view, the second database query being configured to receive an indication of an input source location from a user-interface control based on a value of the selected data element;
  detect that the first and second data views are to be combined in a composite data view, the second view depending from the first view, such that the second view is to be related to the selected data element that was selected by the user from the first view;
  in response to detecting that the first and second views are to be combined in a composite data view:
    establish a selection variable that is under the control of the composite view, the selection variable being configured to store a particular value that identifies a user-selected data element in the first view;
    configure the user-interface control to update the selection variable with the particular value; and
    re-write the second database query to use the particular value stored in the selection variable as the source location for the second database query; and
  present the composite data view at the display device.

17. The system as recited in claim 16, wherein the view composition module being configured to detect that the first and second data views are to be combined in a composite data view comprises the view composition module being configured to detect that the first and second data views are to be combined in a shared source composite data view.

18. The system as recited in claim 16, wherein the view composition module being configured to detect that the first and second data views are to be combined in a composite data view comprises the view composition module being configured to detect that the first and second data views are to be combined in a selection-based composite data view.

19. The system as recited in claim 16, wherein the view composition module being configured to detect that the first and second data views are to be combined in a composite data view comprises the view composition module being configured to infer a relationship between the selection type of the first view and the source type of the second view.

* * * * *

UNITED STATES PATENT AND TRADEMARK OFFICE
CERTIFICATE OF CORRECTION

PATENT NO.       : 8,214,379 B2
APPLICATION NO.  : 12/696628
DATED            : July 3, 2012
INVENTOR(S)      : Williams et al.

Page 1 of 1

It is certified that error appears in the above-identified patent and that said Letters Patent is hereby corrected as shown below:

In column 10, line 40, in Claim 11, after "computer" delete "program product".

In column 10, line 47, in Claim 12, after "computer" delete "program product".

In column 10, line 54, in Claim 13, after "computer" delete "program product".

Signed and Sealed this
Thirtieth Day of October, 2012

David J. Kappos
*Director of the United States Patent and Trademark Office*